J. H. Manny,
Harvester Cutter

No. 13149 — Patented June 26, 1855.

UNITED STATES PATENT OFFICE.

JOHN H. MANNY, OF ROCKFORD, ILLINOIS.

IMPROVEMENT IN CUTTERS OF HARVESTERS.

Specification forming part of Letters Patent No. 13,149, dated June 26, 1855.

*To all whom it may concern:*

Be it known that I, JOHN H. MANNY, of Rockford, in the county of Winnebago and State of Illinois, have invented certain new and useful Improvements in Cutters of Harvesting-Machines, of which the following is a full, clear, and exact description, reference being had to the accompanying drawings of the same, which make part of this specification, and in which—

Figure 1:
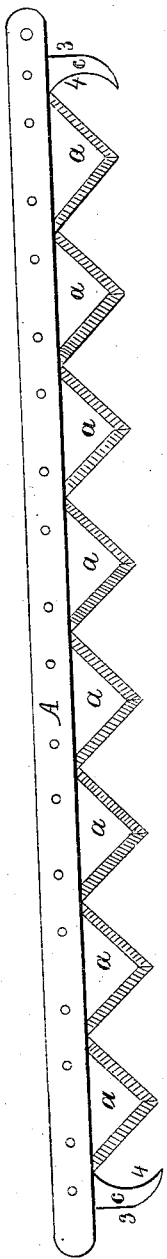
Figure 3:
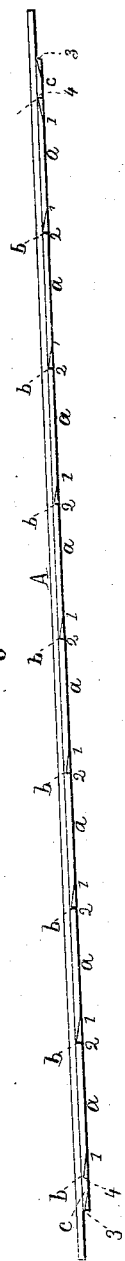
Figure 2:
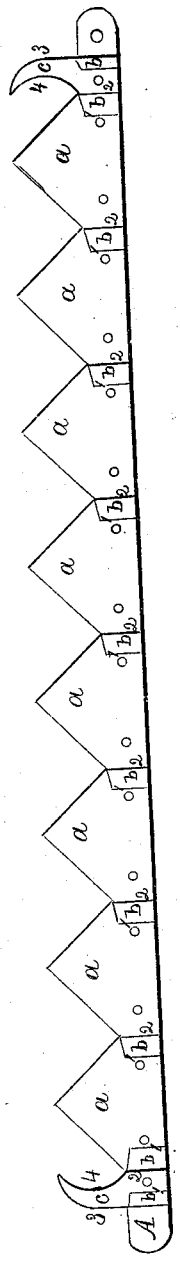

Figure 1 represents a plan of a sickle embracing my improvements. Fig. 2 represents a view of the same turned bottom side uppermost, and Fig. 3 represents a view of the rear edge of the sickle to show the clearing-notches.

My invention and improvement consist in constructing the under side of the blade of the harvester with a series of inclined notches, so that while the blade is vibrating in one direction the inclined side of the notch will tend to rise upon and pass over a fiber or other obstruction, while on its vibration back in the opposite direction the vertical or square side of the notch will catch and pull along the fiber or other substance entangled upon the finger or support for the blade. In this way the substances which tend to entangle and clog the blade and guard-fingers are kept constantly moving along until they are carried out by the motion of the sickle instead of being kept at or near the same place, as they would if acted upon by a notch or protuberance such as is found in other sickles, which move fibers back and forth in one direction as much as the other.

My invention and improvement consist, further, in the combination, with each end of the sickle, of a clearing-piece to draw out and discharge the fibers from the apertures which form the bearings for the end of the sickle in the divider and guards, and by this means prevent the clogging of the ends of the sickle at those points, to which it has heretofore been very liable.

In the accompanying drawings, A represents the stock of the sickle; *a a*, a series of steel plates riveted to the stock to form a scalloped cutting-edge. A series of angular notches, *b*, are formed on the under side of the sickle at its rear edge. The side 1 of each notch is inclined at an angle of about twenty degrees to the side of the sickle, and the side 2 of the notch is at right angles to the side of the sickle. At each end of the series of steel plates *a a* clearing-piece, *c*, narrower than the plates *a*, is secured to the stock, with its outer edge, 3, thin and sharp, that it may tend to cut off grass or fibers, rather than to push them into the aperture in the divider or guard into and out of which this clearing-piece necessarily plays. The inner edge, 4, of this clearing-piece is square and either at right angles to the bar A or inclined or curved inward so as more readily to catch and pull out any fiber that may chance to be carried into the aperture by its outer edge, instead of being cut off thereby.

These improvements are applicable to sickles of any construction, and therefore I do not intend to limit them to the kind which I have shown in the drawings and herein described, which is merely introduced for the purpose of showing one application of the invention.

What I claim as my invention, and desire to secure by Letters Patent, is—

1. Constructing the cutters of harvesters with clearing-notches of the form herein described.

2. The combination of clearing-hooks with the cutters of harvesters, substantially as herein set forth.

In testimony whereof I have hereunto subscribed my name.

JOHN H. MANNY.

Witnesses:
P. H. WATSON,
F. G. DEFONTAINE.